United States Patent [19]

Larson

[11] Patent Number: 5,337,330

[45] Date of Patent: Aug. 9, 1994

[54] PRE-IONIZER FOR A LASER

[75] Inventor: Donald G. Larson, San Diego, Calif.

[73] Assignee: Cymer Laser Technologies, San Diego, Calif.

[21] Appl. No.: 958,922

[22] Filed: Oct. 9, 1992

[51] Int. Cl.⁵ .............................................. H01S 3/097
[52] U.S. Cl. .......................................... 372/86; 372/55
[58] Field of Search ..................... 372/86, 82, 65, 55; 174/152 R, 152 E

[56] References Cited

U.S. PATENT DOCUMENTS

| | | | |
|---|---|---|---|
| 3,679,999 | 7/1972 | Chernoch | 372/70 |
| 4,127,834 | 11/1978 | Stringfellow et al. | |
| 4,180,763 | 12/1979 | Anderson | |
| 4,718,072 | 1/1988 | Marchetti et al. | 372/86 |
| 4,750,943 | 6/1988 | Nelson | |
| 5,247,534 | 9/1993 | Horsche et al. | 372/86 |
| 5,247,535 | 9/1993 | Horsche et al. | 372/86 |

*Primary Examiner*—Rodney B. Bovernick
*Assistant Examiner*—Robert McNutt
*Attorney, Agent, or Firm*—Ellsworth R. Roston; Charles H. Schwartz

[57] ABSTRACT

An anode and a cathode in a laser are spaced in a first direction. A voltage difference between these members produces an electrical discharge which ionizes gases in the laser to react chemically and produce coherent radiation. First and second tubes made from a dielectric material are spaced in the laser in a second direction transverse (preferably perpendicular) to the first direction. The anode, the cathode and the tubes extend through the laser in a direction transverse (preferably perpendicular) to the first and second directions. The tubes are preferably at least a 99.9% pure polycrystalline aluminum oxide ceramic with traces of other metallic elements than aluminum. Bushings made from a material homogeneous (preferably identical) to the tube material are integral with the tube near the opposite tube ends. First electrical conductors extend through the tubes. Second electrical conductors (preferably resilient) contact (preferably line contact) the external tube surfaces to define capacitors with the first conductors and the tube material. Positioning members movably engage the tube external surfaces near the tube ends in co-operation with the resilient members establishing three (3)- line contacts with the tubes for positioning the tubes precisely in the cavity. When a voltage pulse is applied between the first conductor inside each tube and the conductors on such tube, the resultant corona discharge from the external tube surface produces ultraviolet light which pre-ionizes the gases in the cavity. This facilitates the ionization of the gases in the cavity when an anode-cathode electrical discharge is produced.

36 Claims, 2 Drawing Sheets

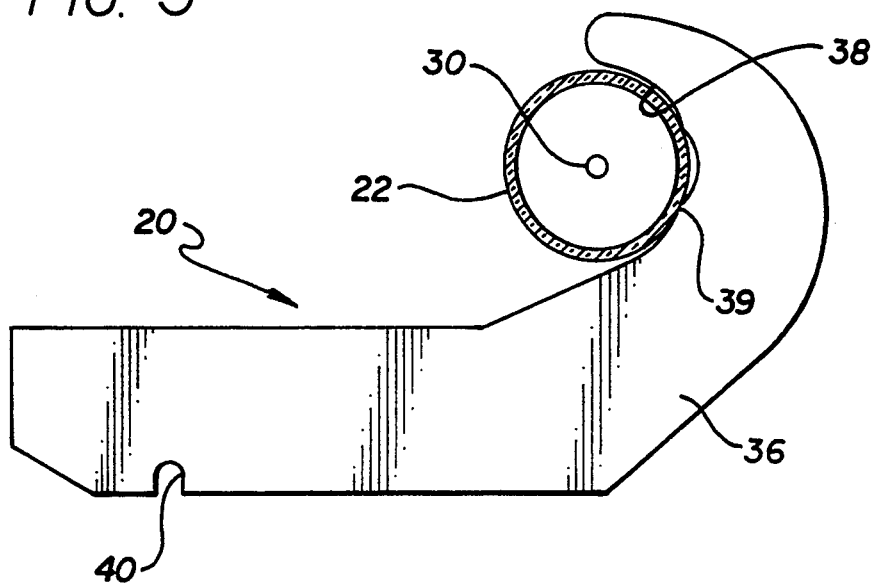
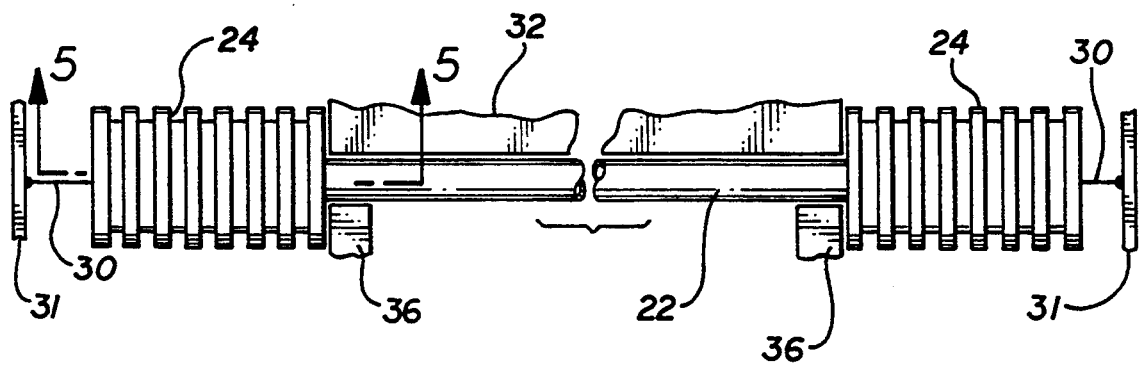
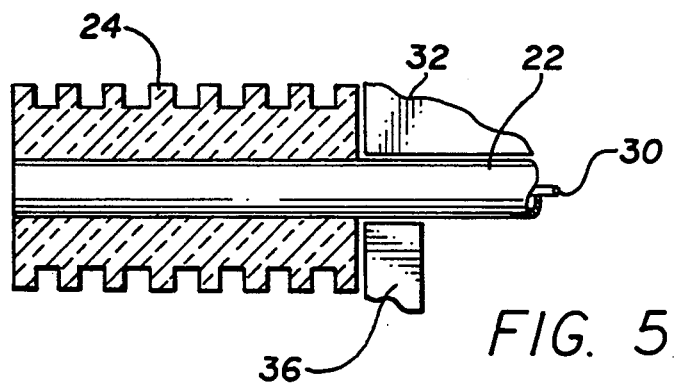

PRE-IONIZER FOR A LASER

This invention relates to apparatus for pre-ionizing the gases in laser systems to facilitate the ionization of such gases by electrical discharge pulses introduced to the lasers. More particularly, this invention provides apparatus which operates with greater precision and reliability than in the prior art to pre-ionize the gases in laser systems.

Lasers are used in a wide and expanding variety of applications. For example, lasers are used in various medical applications such as to repair torn or detached retinas in eyes or to eliminate plaque from arteries. Lasers are also used in the manufacture of semiconductors to produce patterns of electrical circuits on the surfaces of the semiconductor layers and to drill holes at precise positions in the semiconductors. Lasers are advantageous in these and other applications because they generate coherent radiation of high intensity in a narrow band of wavelengths.

Laser systems generally include a sub-system which pre-ionizes the gas in the laser to facilitate the ionization and chemical reaction of the gases in the cavity when an electrical discharge is produced between an anode and a cathode in the laser. The pre-ionizer may include at least one tube from which a corona discharge is directed to the gases in the cavity. The corona discharge occurs when a voltage pulse is preferably applied between a conductor inside the tubes and at least one conductor outside the tube. Bushings are disposed near the ends of the tubes to maintain the tubes in an insulated relationship. Members are associated with the tubes to position the tubes at a particular position in the laser.

The pre-ionizers now in use have certain inherent disadvantages. One disadvantage is that the bushings are not homogeneous with the tube, thus requiring that the bushings be attached to the tube as by an adhesive. This has limited the utility of the pre-ionizer, particularly over extended periods of time, since the adhesive has tended to deteriorate under the effect of the corona environment. This deterioration of the adhesive poisons the laser gases, requiring more frequent gas changes. The adhesive has also limited the voltage which can be applied between the plates of a capacitor which includes the tube as the dielectric between the capacitor plates. Another disadvantage is that the tube has not been positioned precisely in the laser cavity. A further disadvantage is that the conductor at the periphery of the tube has not always made a positive contact with the tube. Various attempts have been made to resolve these disadvantages. In spite of such attempts, such disadvantages have persisted.

This invention provides an embodiment which overcomes the disadvantages discussed in the previous paragraph. In one embodiment of the invention, an anode and a cathode in a laser are spaced in a first direction. A voltage difference between the anode and the cathode produces an electrical discharge which ionizes gases in the laser to react chemically and produce coherent radiation. First and second tubes made from a dielectric material are spaced in the laser in a second direction transverse (preferably perpendicular) to the first direction. The anode, the cathode and the tubes extend through the laser in a direction transverse (preferably perpendicular) to the first and second directions. The tubes are preferably at least a 99.9% pure polycrystalline aluminum oxide ceramic with traces of other metallic elements than aluminum.

Bushings made from a material homogeneous (preferably identical to) with the tube material are integral with the tube at positions near the opposite tube ends. First electrical conductors extend through the tubes. Second electrical conductors (preferably resilient) contact the external surfaces of the tubes to define capacitors with the first conductors and the tube material. The second conductors preferably make line contact with the external tube surfaces. Electrical conductors movably engage the tube external surfaces near the tube ends to co-operate with the resilient members establishing three (3)-line contacts with the tubes for positioning the tubes precisely in the cavity.

When a voltage pulse is applied between the first conductor inside each tube and the second conductor outside such tube, the resultant corona discharge from the external surface of such tube produces ultraviolet light which pre-ionizes the gases in the cavity. This facilitates the ionization of the gases in the cavity when an electrical discharge is produced between the anode and the cathode.

In the drawings:

FIG. 3 is an enlarged fragmentary end elevational view of certain of the members shown in FIG. 2 and shows these members in an assembled relationship;

FIG. 4 is a side elevational view of a tube and bushings included in the pre-ionizer shown in FIGS. 1–3; and FIG. 5 is an enlarged fragmentary sectional view of the tube and the bushing shown in FIG. 4 and is taken substantially on the line 5—5 of FIG. 4.

Figure 1:
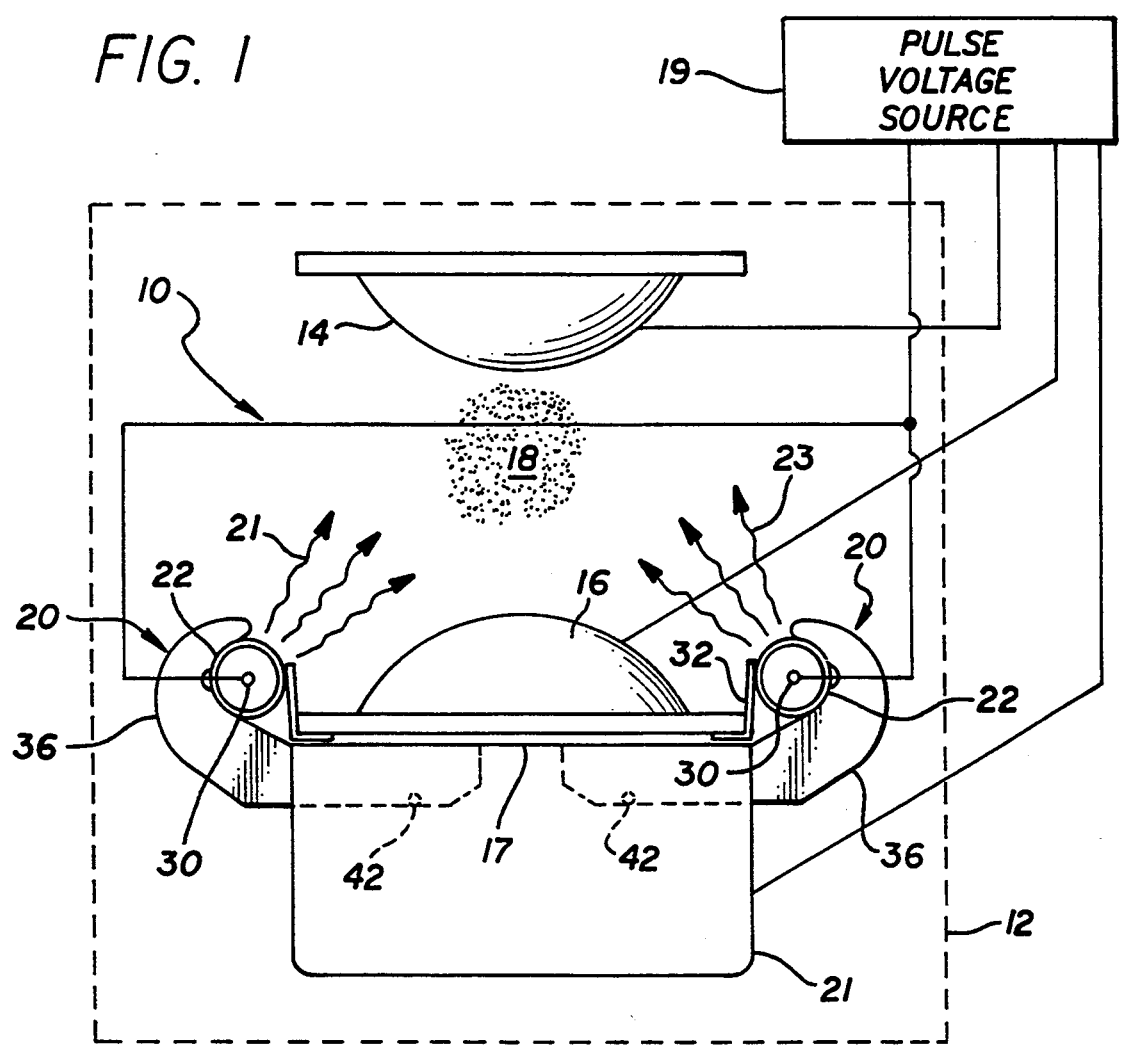
FIG. 1 is a schematic end elevational drawing of members in a laser including a pre-ionizer constituting one embodiment of the invention.
Figure 2:
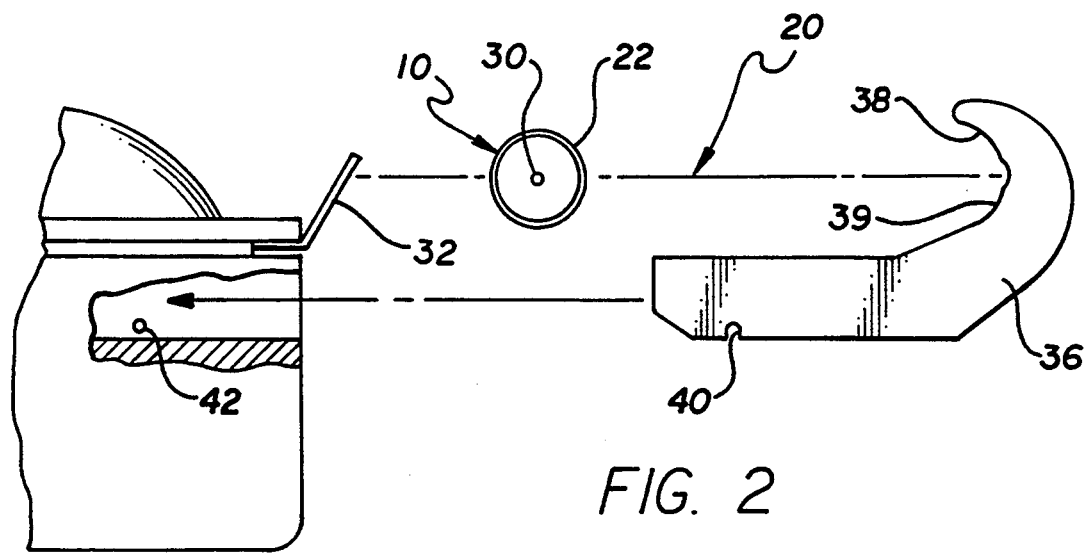
FIG. 2 is an enlarged fragmentary end elevational view (in exploded form) of certain members in the pre-ionizer shown in FIG. 1.

In one embodiment of the invention, a laser generally indicated at 10 is disposed within a cavity indicated in broken lines at 12 in FIG. 1. The laser 10 includes an anode 14 and a cathode 16 which are disposed in the cavity 12 and which are separated from each other in a first direction. The anode 14 may be electrically grounded. Electrically conductive members 17 provide electrical continuity from the cathode 16 to an electrically conductive 18 block 21. Gases are disposed in the cavity. In one type of system, the gases may be krypton (Kr) and fluorine ($F_2$). Alternatively, other gases may be used. The gases are indicated schematically at 18 by dots within the cavity 12. The gases 18 may be recirculated and may be purified during such recirculation.

When a voltage pulse is applied from a source 19 between the anode 14 and the cathode 16 (preferably with the high voltage on the cathode), an electrical discharge is produced between the anode and the cathode. This electrical discharge ionizes the gases 18 in the cavity 12 and causes a chemical reaction to be produced between the gases. For example, krypton (Kr) and fluorine ($F_2$) in the cavity 12 react chemically to produce krypton fluoride (KrF). When this chemical reaction occurs, energy as in the form of light is produced at a particular wavelength in the cavity 12. The coherent energy is produced with high intensity and in a narrow beam. It is directed from the cavity through a window (not shown).

Pre-ionizers generally indicated at 20 may be disposed in the cavity 12 to facilitate the ionization of the gases 18 by introducing ultraviolet light produced by a corona discharge to the gases just before each voltage pulse is applied between the anode 14 and the cathode 16. The direction of the radiation emitted by the corona discharge is indicated schematically in FIG. 1 by wavy lines 23 with arrows at the upper ends of the lines to indicate the direction of the radiation.

The pre-ionizers 20 may be disposed between the electrodes 14 and 16 and may be separated from each other in a second direction transverse (preferably perpendicular) to the first direction. The pre-ionizers 20 extend in the cavity 12 in a third direction transverse (preferably perpendicular) to the first and second directions. The electrodes 14 and 16 also extend in the cavity in the third direction. This third direction may be considered to be into the plane of the paper in FIG. 1 and is the direction shown in FIG. 4.

Each of the pre-ionizers 20 includes a hollow tube 22 made from a suitable material providing a high dielectric constant and a high dielectric strength. Preferably the tubes 20 are made from a ceramic material such as that manufactured and sold by the General Electric Company under the trademark "Lucalox". This material constitutes a polycrystalline translucent aluminum oxide with a 99.9% purity and with traces of the following metallic elements (other than aluminum) in approximately the following number of parts per million:

| Metallic Element | Number of Detected parts per Million |
|---|---|
| Silicon (Si) | 50 |
| Iron (Fe) | 4 |
| Calcium (Ca) | 7 |
| Magnesium (Mg) | 180 |
| Potassium (K) | 50 |
| Sodium (Na) | 80 |
| Lithium (Li) | <1 |
| Molybdenum (Mo) | 10 |
| Chromium (Cr) | 2 |
| Copper (Cu) | 4 |

This material prevents any corona discharge on the external surfaces of the tubes 22 from entering into the tubes.

"Lucalox" ceramic is essentially a single phase material manufactured by bonding aluminum oxide grains (grain size=30 microns average) directly to one another. The fine-grain, high purity aluminum oxide is processed at room temperature and then fired at temperatures higher than usual for ceramics. The resulting glass-free structure provides a high density (at least 3.97 gm/cm$^3$) and a high temperature stability (melting point=2040° C.) not found with most conventional ceramics.

Mechanically, "Lucalox" ceramic is very hard and exhibits a high compressive strength ($2.24 \times 10^9$Pa) and a high modulus of rupture ($2.75 \times 10^8$Pa). It is capable of withstanding up to 25,000 psi at 1800° C. in uniaxial compression. Electrically, "Lucalox" ceramic demonstrates a high dielectric strength (1700 volts/mil), a high dielectric constant (10.1 at 1 gigahertz) low dissipation ($7.5 \times 10^{-4}$ and low loss factor ($7.6 \times 10^{-3}$). All of these electrical characteristics are at 20° C. with a thickness of 0.020″. The material transmits wavelengths from the near ultraviolet spectrum through the visible spectrum and into the infrared spectrum.

Bushings 24 (FIGS. 4 and 5) are disposed on the tubes 22 near the opposite ends of the tubes. The material of the bushings 24 is preferably homogeneous with the material of the tubes 22. Even more preferably, the material of the bushings 24 is identical to the material of the tubes 22. When the bushings 24 and the tubes 22 are made from the "Lucalox" ceramic, the bushings 24 and the tubes 22 are preferably made as by machining from a single integral piece of material. This eliminates the need for any adhesive between the bushings 24 and the tubes 22 and provides the combination of the bushings and the tubes with the same high dielectric properties individual to the material of the bushings and the tubes when the bushings and the tubes are separate. The bushings 24 and the tubes 22 can also be fabricated from multiple parts in a forming and firing operation where the resultant combination of a tube and bushings becomes one homogeneous monolithic structure with no boundary and no sealing component as by solid state diffusion bonding.

An electrical conductor 30 is disposed within each of the tubes 22 along the length of the tube. The electrical conductor 30 is preferably attached to a housing 31 (FIG. 4) for the laser 10 to ground the electrical conductor electrically. An electrical conductor 32 is disposed on the surface of the tube 22 in a line contact with the external surface of each of the tubes 22 along the length of the tube. The electrical conductor 32 may be in the form of a resilient spring constrained to be disposed against the surface of the associated tube 22 with a moderate force. The electrical conductor 32 extends between the bushings on the tubes as shown in FIG. 4. The electrical conductor 32 may be made from a suitable material such as brass.

Positioning members 36 contact the external surfaces of the tubes 22 as at 38 and 39 at the ends of the tubes at a pair of spaced line positions around the peripheries of the tubes. The positioning members 36 co-operate with the electrical conductors 32 to establish a three (3)-line contact with the associated tubes 22 around the peripheries of the tubes. The positioning members 36 may be preferably made from a suitable material such as brass. Alternatively, the positioning members 36 may be made from an electrical insulating material.

The positioning members 36 are provided with slots 40 which rest in pins 42 in the block 21 when the positioning members are properly positioned in contact with the tubes 22. The pins 42 also hold the electrical conductors 32 in a fixed position so that the conductors can contact the external surfaces of the tubes 22. This assures that uniform forces are established against the tubes 22 by the 3-line contacts defined the conductors 32 and the positioning members 36. The positioning members 36 is preferably disposed at spaced positions between the bushings 24. However, they may extend along the full distance between the bushings 24. Preferably the conductors 32 and the positioning members 36 receive the same high voltage as are provided on the cathode 16.

The electrical conductors 30 define first plates of capacitors and the electrical conductors 32 and the positioning member 36 define opposite plates of capacitors. The tubes 22 serve as the dielectric material between the plates of the capacitors. Preferably a high voltage is applied to the electrical conductors 32 and the positioning members 36 and the electrical conductors 30 are grounded. The dielectric material of the tube 22 has properties to support a capacitive corona discharge without dielectric breakdown.

When a voltage pulse from the source 19 is applied between the electrical conductors 30 as one capacitor plate and the electrical conductors 32 and the positioning member 36 as a second capacitor plate, the electrical charges produced in such capacitors cause corona discharges (indicated by the wavy lines 23 in FIG. 1) to be produced from the surfaces of the tubes. These corona discharges emit radiation which travel to the space where the gases 18 are located. The radiations pre-ionize the gases 18 in the space between the anodes 14 and the cathode 16 so that the ionization of the gases is facilitated when a voltage pulse is produced between the anode 14 and the cathode 16.

As shown in FIG. 4, the electrical conductors 32 are disposed on one side of the bushings 24 and the ground of the electrical conductors 30 to the housing 31 are disposed on the other side of the bushings. The bushings 24 accordingly act to considerably lengthen the distance between the high voltage applied to ground from the electrical conductors 32 and the positioning members 36. This prevents any electrical discharge to ground from the electrical conductors 32 and the positioning members 36. The integral relationship between the tubes 22 and the bushings 24 facilitate this electrical isolation. This is in contrast to the prior art since there tended to be an electrical discharge through the adhesive between the tubes and the bushings in the prior art, particularly as the adhesive deteriorated.

The pre-ionizers 20 constituting this invention have certain important advantages. Since the tubes 22 and the bushings 24 are homogeneous and are integral, the tubes and the bushings are able to withstand greater voltages than in the prior art. This integral relationship also prevents the gases in the laser from being poisoned by any adhesive between the tubes and the bushings as in the prior art. Furthermore, the use of resilient members as the electrical conductors 32 assures that proper contacts will be made between the electrical conductors and the tubes 22. The cooperation of the resilient electrical conductors 32 and the positioning members 36 in establishing three (3)-line contacts with the tubes 22 assures that the tubes will be properly positioned, and will be maintained in this proper position, without any undue force on the tubes. The movement of the positioning members 36 to the position for establishing the desired three (3)-point contact with the tubes 22 in co-operation with the resilient electrical conductors 32 is also assured by the detent co-operation between the slots 40 and the pins 42.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for use in a laser,
    a tube constructed from a dielectric material having properties to support a capacitive corona discharge without dielectric breakdown,
    means disposed within the tube to define a first capacitor plate,
    means disposed outside of the tube in engagement with the tube for defining a second capacitor plate,
    bushings disposed near the end of the tube and integral with the tube, and
    means for introducing a voltage between the means defining the first and second capacitor plates to charge the capacitor and obtain a corona discharge from the corona discharge from the tube.

2. In a combination as set forth in claim 1,
    an anode in the laser,
    a cathode in the laser,
    a cavity including the anode and the cathode,
    there being a gas in the cavity,
    the radiation emitted by the corona discharge occurring in the space in the cavity between the anode and the cathode to facilitate the ionization of the gas in the cavity when there is an electrical discharge between the anode and the cathode.

3. In a combination as set forth in claim 1,
    the means defining the second capacitor plate including a resilient element disposed against the exterior of the tube and extending along the tube and defining a line contact with the tube.

4. In a combination as set forth in claim 3,
    means disposed in co-operative relationship with the resilient element for holding the tube in fixed relationship along the length of the tube.

5. In combination for use in a laser,
    a tube made from a dielectric material and having properties to support a capacitive corona discharge without dielectric breakdown,
    a first electrical conductor disposed in the tube and extending along the length of the tube to define a first plate of a capacitor,
    the tube serving as the dielectric of the capacitor,
    a resilient element made from an electrically conductive material and disposed externally of the tube and engaging the tube along substantially the length of the tube to provide a line contact with the tube and to define a second plate of the capacitor,
    means disposed along the length of the tube for co-operating with the resilient element in providing a support for the tube at a plurality of positions around the periphery of the tube to maintain the tube in a particular relationship in engagement with the resilient element,
    means for introducing a voltage between the first electrical conductor and the resilient element to produce radiation emitted by a corona discharge from the outer surface of the tube,
    an anode,
    a cathode,
    means defining a laser cavity enclosing the anode and the cathode,
    there being gases in the laser cavity,
    the tube being disposed relative to the laser cavity to introduce the radiation emitted by corona discharge into the laser cavity for ionizing the gases in the laser cavity.

6. In combination for use in a laser,
    a tube made from a dielectric material and having properties to support a capacitive corona discharge without dielectric breakdown,
    a first electrical conductor disposed in the tube and extending along the length of the tube to define a first plate of a capacitor,
    the tube serving as the dielectric of the capacitor,
    a resilient element made from an electrically conductive material and disposed externally of the tube and engaging the tube along substantially the tube to provide a line contact with the tube and to define a second plate of the capacitor, means disposed along the length of the tube for co-operating with the resilient element in providing support for the tube to maintain the tube in a fixed position in engagement with the resilient element, means for introducing a voltage between the first electrical conductor and the resilient element to produce radiation emitted by a corona discharge from the outer surface of the tube, an anode, a cathode, means defining a laser cavity enclosing the anode and the cathode, there being gases in the laser cavity, the tube being disposed relative to the laser cavity to introduce the radiation emitted by corona discharge into the laser cavity for ionizing the gases in the laser cavity, the support means for the tube being shaped to provide contacts on the periphery of the tube to provide a precise positioning of the tube in cooperation with the line contact provided by the resilient element, the resilient element being electrically conductive and being at a voltage different from the voltage on the first electrical conductor.

7. In a combination as set forth in claim 6, means disposed in co-operative relationship with the support means and the resilient element for maintaining the support means and the resilient element in fixed position relative to the tube, and a pair of dielectric members disposed on the tube near the ends of the tube and integral with the tube and made from a material homogeneous with the material of the tube.

8. In combination for use in a laser, a tube made from a dielectric material and having properties to support a capacitive corona discharge without dielectric breakdown, a first electrical conductor disposed in the tube and extending along the length of the tube to define a first plate of a capacitor, the tube serving as the dielectric of the capacitor, a resilient element made from an electrically conductive material and disposed externally of the tube and engaging the tube along substantially the tube to provide a line contact with the tube and to define a second plate of the capacitor, means disposed along the length of the tube for co-operating with the resilient element in providing support for the tube to maintain the tube in a fixed position in engagement with the resilient element, means for introducing a voltage between the first electrical conductor and the resilient element to produce radiation emitted by a corona discharge from the outer surface of the tube, an anode, a cathode, means defining a laser cavity enclosing the anode and the cathode, there being as in the laser cavity, the tube being disposed relative to the laser cavity to introduce the radiation emitted by corona discharge into the laser cavity for ionizing the gases in the laser cavity, a pair of dielectric members disposed on the tube near the ends of the tube and integral with the tube and made from a material homogeneous with the material of the tube.

9. In a combination for use in a laser, a tube made form a dielectric material constituting a polycrystaline aluminum oxide ceramic with traces of other metallic elements than aluminum, the aluminum oxide have a purity greater than ninety nine percent (99%) in the dielectric material, a first electrical conductor disposed within the tube and defining a first capacitor plate, a second electrical conductor disposed on the external surface of the tube and defining a second capacitor plate, means for introducing a voltage between the first and second capacitor plates to produce radiation emitted by a corona discharge from the surface of the tube without any penetration of the corona discharge into the tube, and dielectric members disposed on the tube near the opposite ends of the tube and integral with the tube and having properties homogeneous with those of the tube.

10. In a combination as set forth in claim 9, the dielectric members being made from the same material as the material of the tube.

11. In a combination as set forth in claim 9, means defining a cavity for holding the laser, an anode in the cavity, a cathode in the cavity in a spaced relationship with the anode, there being gases in the cavity for ionization upon an electrical discharge between the anode and the cathode, the radiation emitted by the corona discharge from the tube extending into the cavity to pre-ionize the gases in the cavity.

12. In combination for use in a laser, a first tube made from a dielectric material having high dielectric properties, a first pair of bushings each made from a dielectric material homogeneous with the dielectric material of the first tube and disposed on the first tube near an individual end of the tube and integral with the external surface of the tube, first electrically conductive means disposed within the first tube and defining a first plate of a first capacitor, second electrically conductive means disposed on the first tube externally of the first tube and defining a second plate of the first capacitor, a second tube made from the same material as the first tube and spaced in a first direction from the first tube, a second pair of bushings corresponding to the first pair of bushings and disposed on the second tube near an individual end of the second tube and integral with the second tube, third electrically conductive means disposed within the second tube and defining a first plate of a second capacitor, fourth electrically conductive means disposed on the second tube externally of the second tube and defining a second plate of the second capacitor, means defining a cavity for holding the laser, an anode in the cavity, a cathode disposed in the cavity and spaced in a first direction from the anode, there being in the cavity gases ionized by an electrical discharge between the anode and the cathode, the first and second tubes being spaced from each other in a second direction transverse to the first direction and being disposed relative to the gases in the cavity for pre-ionizing the gases in the cavity in accordance with radiation emitted by the corona discharges from the external peripheries of the tubes.

13. In a combination as set forth in claim 12,
the means defining the cavity extending in a third direction transverse to the first and second directions,
the first and second tubes and the anode and the cathode extending in the third direction.

14. In a combination as set forth in claim 12,
each of the second and fourth electrically conductive means including a resilient element disposed to contact the associated one of the first and second tubes in a line on the tube in the third direction.

15. In a combination as set forth in claim 12,
means disposed on the first tube near the opposite ends of the first tube for engaging the first tube at a pair of spaced positions around the tube in an annular direction for co-operating with the second electrically conductive means in fixedly positioning the first tube, and
means disposed on the second tube near the opposite ends of the second tube for engaging the second tube at a pair of spaced positions around the tube in an annular direction for co-operating with the fourth electrically conductive means in fixedly positioning the second tube.

16. In a combination as set forth in claim 15,
each of the second and fourth electrically conductive means including a resilient element disposed to contact the associated one of the first and second tubes at a line on such tube,
means disposed in a locking relationship with the engaging means for the first tube for locking such engaging means in a fixed position when the engaging means has a particular relationship with the second conductive means, and
means disposed in locking relationship with the engaging means for the second tube for locking such engaging means in a fixed position when the engaging means has the particular relationship with the fourth electrically conductive means.

17. In a combination for use in a laser,
a first tube made from a polycrystaline aluminum oxide with a 99.9% purity and with traces of other metallic elements than aluminum,
a second tube made from a polycrystaline aluminum oxide with a 99.9% purity and with traces of other metallic elements than aluminum,
means associated with the first tube for producing a corona discharge from such tube,
means associated with the second tube for producing a corona discharge from such tube,
means defining a cavity for a laser,
an anode in the cavity, and
a cathode disposed in the cavity and displaced from the anode in a first direction,
there being gases in the cavity for ionization and chemical reaction upon an electrical discharge between the anode and the cathode,
the first and second tubes being spaced from each other in a second direction transverse to the first direction to produce the corona discharges in the cavity for a preionization of the gases in the cavity by radiation emitted from the corona discharges and for chemical reaction of the gases in the cavity,
first bushing means integral with the external surface of the first tube near the opposite ends of the first tube and made from the same material as the first tube, and
second bushing means integral with the external surface of the second tube near the opposite ends of the second tube and made from the same material as the second tube.

18. In a combination as set forth in claim 17,
the corona discharge means for the first tube including a first electrically conductive resilient element constructed and disposed to engage the external surface of the first tube at a line on such surface, and
the corona discharge means for the second tube including a second electrically conductive resilient element constructed and disposed to engage the external surface of the second tube at a line on such surface.

19. In a combination as set forth in claim 18,
means associated with the first electrically conductive resilient element for establishing a three line contact, including the contact of the first resilient element, to position the first tube in a particular relationship to the anode and the cathode, and
means associated with the second electrically conductive resilient element for establishing a three line contact, including the contact of the second resilient element, to position the second tube in a particular relationship to the anode and the cathode.

20. In combination for use in a laser,
means for defining a cavity for the laser,
an anode in the laser,
a cathode spaced in the cavity from the anode in a first direction,
there being gases in the cavity,
means for energizing the anode and the cathode to produce an electrical discharge between the anode and the cathode and to produce an ionization and chemical reaction of the gases in the cavity in accordance with such electrical discharge,
a first tube disposed in the cavity and made from a dielectric material,
a first electrical conductor disposed in the first tube,
a first resilient electrically conductive member disposed externally to the first tube in line engagement with the first tube,
first means associated with the first tube and the first resilient electrically conductive member for establishing an engagement between the first resilient conductive member and the first tube,
a second tube displaced in the cavity and spaced from the first tube in a second direction substantially perpendicular to the first direction and made from the dielectric material,
a second electrically conductive member disposed in the second tube,
a second resilient electrically conductive member disposed externally to the second tube in line engagement with the second tube,
second means associated with the second tube and the second electrically conductive member for establishing an engagement between the second resilient conductive member and the second tube, and means for introducing a voltage between the first electrical conductor and the first resilient electrically conductive member and between the second electrical conductor and the second resilient electrically conductive member to produce a corona discharge from the external surfaces of the first and second tubes for pre-ionizing the gas in the cavity.

21. In a combination as set forth in claim 20,
first bushings integral with the external surface of the first tube near the ends of the first tube and made from a material homogeneous with the material of the first tube, and
second bushings integral with the external surface of the second tube near the ends of the second tube and made from the same material as the first bushings.

22. In a combination as set forth in claim 21,
the first and second tubes being made from a 99.9% pure polycrystalline aluminum oxide with traces of other metallic elements than aluminum, and
the first and second bushings being made from the same material as the tubes.

23. In a combination as set forth in claim 22,
the anode and the cathode and the first and second tubes and the first and second electrical conductors and the first and second resilient electrically conductive members and the first and second engaging means being disposed in the cavity in a third direction substantially perpendicular to the first and second directions.

24. In combination for use in a laser,
a housing,
a tube disposed in the housing and made from a material having a high dielectric constant,
a first electrical conductor disposed in the tube and connected to the housing,
a bushing made from a material having a high dielectric constant and having properties homogeneous to the tube, the bushing being integral with the external surface of the tube near one end of the tube,
a second electrical conductor disposed on the external surface of the tube at a position further removed from the housing than the bushing,
means for retaining the second electrical conductor in a fixed position on the housing, and
means for producing a voltage difference between the first and second electrical conductors to produce a corona discharge from the tube.

25. In a combination as set forth in claim 24,
the tube and the bushing being made from the same material.

26. In a combination as set forth in claim 25,
the second electrical conductor including a resilient member, and
the retaining means cooperating with the resilient member to provide a three (3)-line contact against the external surface of the tube.

27. In a combination as set forth in claim 24,
the tube being made from a dielectric material constituting a polycrystalline aluminum oxide ceramic with traces of other metallic elements than aluminum, the aluminum oxide having a purity greater than ninety nine percent (99%) in the dielectric material.

28. In a combination as set forth in claim 27,
the second electrical conductor constituting a resilient element,
the retaining means including a positioning member shaped to engage the external surface of the tube and to co-operate with the resilient element in establishing a three (3)-line contact with the tube,
the positioning member on the retaining means having a detent, and
electrically conductive means having a detent cooperative with the positioning member on the retaining means to position the positioning member in the relationship with the tube and the resilient element to establish the three-line contact.

29. In combination for use in a laser,
a cathode,
an anode disposed in spaced relationship to the cathode in a first direction,
a first tube made from a dielectric material,
a second tube made from the dielectric material and spaced from the first tube in a second direction transverse to the first direction,
a first electrical conductor disposed in the first tube,
a second electrical conductor disposed in the second tube,
a first resilient element disposed on the first tube,
a second resilient element disposed on the second tube,
the first and second resilient elements being electrically conductive,
first means disposed on the first tube and co-operative with the first resilient element to establish a three (3)-line contact with the first tube in cooperation with the first resilient element,
second means disposed in the second tube and cooperative with the second resilient element to establish a three (3)-line contact with the second tube in cooperation with the second resilient element,
third means disposed relative to the first means for establishing a detent relationship with the first means to provide the three (3)-line contact against the first tube in cooperation with the first resilient element, and
fourth means disposed relative to the second means for establishing a detent relationship with the second means to provide the three (3)-line contact against the second tube in cooperation with the second resilient element.

30. In a combination as set forth in claim 29,
the first, second, third and fourth means being electrically conductive and the third means providing an electrical conductivity with the first means and the first resilient element and the fourth means providing an electrical conductivity with the second means and the second resilient element.

31. In a combination as set forth in claim 30,
a first pair of bushings made from the same material as the first tube near the opposite ends of the first tube and disposed on the first tube and integral with the first tube,
a second pair of bushings made from the same material as the second tube and disposed on the second tube near the opposite ends of the second tube and fused to the second tube,
a housing made from an electrically conductive material,
the first and second tubes and the anode and the cathode being disposed in the housing, and
the first and second electrical conductors extending to the housing and being connected to the housing.

32. In a combination as set forth in claim 29, a first pair of bushings disposed on the first tube near the ends of the first tube and integral with the first tube and made from a material having substantially the same properties as the first tube, and a second pair of bushings disposed on the second tube near the ends of the second tube and integral with the second tube and made from a material having substantially the same properties as the second tube.

33. In combination for use in a laser, means for defining a laser cavity, a tube made from a dielectric material and having properties to support a capacitive corona discharge without dielectric breakdown, a first electrical conductor disposed in the tube and extending along the length of the tube to define a first plate of a capacitor, the tube serving as the dielectric of the capacitor, a resilient element made from an electrically conductive material and disposed externally of in the tube and engaging the tube along substantially the length of the tube to provide a line contact with the tube and to define a second plate of the capacitor, means disposed along the length of the tube for cooperating with the resilient element in providing support for the tube at a plurality of positions around the periphery of the tube to maintain the tube in a particular relationship in engagement with the resilient element, means for introducing a voltage between the first electrical conductor and the resilient element to produce radiation emitted by a corona discharge from the outer surface of the tube, there being gases in the laser cavity, the tube being disposed relative to the laser cavity to introduce the radiation emitted by the corona discharge into the laser cavity for ionizing the gases in the laser cavity.

34. In combination for use in a laser, means for defining a laser cavity, a tube made from a dielectric material and having properties to support a capacitive corona discharge without dielectric breakdown, a first electrical conductor disposed in the tube and extending along the length of the tube to define a first plate of a capacitor, the tube serving as the dielectric of the capacitor, a resilient element made from an electrically conductive material and disposed in the tube and engaging the tube along substantially the length of the tube to provide a line contact with the tube and to define a second plate of the capacitor, means disposed along the length of the tube for cooperating with the resilient element in providing support for the tube to maintain the tube in a fixed position in engagement with the resilient element, means for introducing a voltage between the first electrical conductor and the resilient element to produce radiation emitted by a corona discharge from the outer surface of the tube, there being gases in the laser cavity, the tube being disposed relative to the laser cavity to introduce the radiation emitted by the corona discharge into the laser cavity for ionizing the gases in the laser cavity, the support means for the tube being shaped to provide contacts on the periphery of the tube to provide a precise positioning of the tube in cooperation with the line contact provided by the resilient element, the resilient element being electrically conductive and being at a voltage different from the voltage on the first electrical conductor.

35. In a combination as set forth in claim 34, means disposed in co-operative relationship with the support means and the resilient element for maintaining the support means and the resilient element in fixed position relative to the tube, and a pair of dielectric members disposed on the tube near the ends of the tube and integral with the tube and made from a material homogeneous with the material of the tube.

36. In combination for use in a laser, means for defining a laser cavity, a tube made from a dielectric material and having properties to support a capacitive corona discharge without dielectric breakdown, a first electrical conductor disposed in the tube and extending along the length of the tube to define a first plate of a capacitor, the tube serving as the dielectric of the capacitor, a resilient element made from an electrically conductive material and disposed in the tube and engaging the tube along substantially the length of the tube to provide a line contact with the tube and to define a second plate of the capacitor, means disposed along the length of the tube for cooperating with the resilient element in providing support for the tube to maintain the tube in a fixed position in engagement with the resilient element, means for introducing a voltage between the first electrical conductor and the resilient element to produce radiation emitted by a corona discharge from the outer surface of the tube, there being gases in the laser cavity, the tube being disposed relative to the laser cavity to introduce the radiation emitted by the corona discharge into the laser cavity for ionizing the gases in the laser cavity, a pair of dielectric members disposed on the tube near the ends of the tube and integral with the tube and made from a material homogeneous with the material of the tube.

* * * * *